United States Patent
Ogawa et al.

(10) Patent No.: US 8,807,252 B2
(45) Date of Patent: Aug. 19, 2014

(54) DRIVING APPARATUS FOR HYBRID VEHICLE

(75) Inventors: Hiroshi Ogawa, Tokyo (JP); Masaya Miyazaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 301 days.

(21) Appl. No.: 13/067,585

(22) Filed: Jun. 10, 2011

(65) Prior Publication Data

US 2011/0308876 A1  Dec. 22, 2011

(30) Foreign Application Priority Data

Jun. 18, 2010 (JP) .................................. 2010-138939

(51) Int. Cl.
- *B60K 6/42* (2007.10)
- *B60K 6/50* (2007.10)
- *B60K 1/00* (2006.01)
- *B60K 17/356* (2006.01)

(52) U.S. Cl.
USPC ....................................... 180/65.22; 180/292

(58) Field of Classification Search
USPC ............................................... 180/292, 65.22
See application file for complete search history.

(56) References Cited

U.S. PATENT DOCUMENTS

| | | | |
|---|---|---|---|
| 6,557,656 B2 * | 5/2003 | Haniu et al. | 180/65.6 |
| 2008/0258569 A1 * | 10/2008 | Kano et al. | 310/51 |

FOREIGN PATENT DOCUMENTS

| | | |
|---|---|---|
| JP | 2004-330848 A | 11/2004 |
| JP | 2005-35313 A | 2/2005 |

* cited by examiner

*Primary Examiner* — Hau Phan
*Assistant Examiner* — Bryan Evans
(74) *Attorney, Agent, or Firm* — McGinn IP Law Group, PLLC (57) ABSTRACT

In a driving apparatus for a hybrid vehicle, a travel motor is provided on a rear end of the power unit such that power from the travel motor is transmitted to a differential mechanism from a motor shaft via a gear train and a pinion shaft. Further, an engine is provided on a front end of the power unit, and a generator is provided in the center of the power unit. The engine and the generator are coupled via a gear train, and a generator shaft is disposed above a crankshaft. Thus, a space can be secured below the generator so that the pinion shaft can be disposed below the generator.

8 Claims, 7 Drawing Sheets

11. Power unit (driving apparatus)
20. Engine
21. Travel motor
22. Generator (power generation motor)
23. Differential mechanism
33. Motor shaft (rotary shaft)
34. Gear train
35. Pinion shaft (front wheel output shaft)
43. Generator shaft (rotary shaft)
44. Gear train
45. Crankshaft

Fig. 7

DRIVING APPARATUS FOR HYBRID VEHICLE

CROSS-REFERENCE TO RELATED APPLICATIONS

The present application claims priority from Japanese Patent Application No. 2010-138939 filed on Jun. 18, 2010, the entire contents of which are hereby incorporated by reference.

BACKGROUND OF THE INVENTION

1. Field of the Invention

The present invention relates to a driving apparatus for a hybrid vehicle, which is installed in a longitudinal direction of a vehicle body.

2. Description of the Related Art

A parallel system is available as a driving system for a hybrid vehicle that uses an engine and an electric motor as drive sources. In a parallel system, the engine is driven as a main power source for travel, while the electric motor is driven as an auxiliary power source during startup and acceleration. A series system, in which the engine is driven as a power source for power generation and the electric motor is driven as the power source for travel, is also available. Further, a series parallel system combining the series system and the parallel system has been developed. A driving apparatus for these types of hybrid vehicle is constituted by not only an engine, but also a power generation motor driven by the engine, a travel motor coupled to a drive wheel, and so on. When the driving apparatus is installed in a longitudinal direction of a vehicle body, the engine and the power generation motor of the driving apparatus are typically disposed coaxially (see Japanese Unexamined Patent Application Publication No. 2004-330848 and Japanese Unexamined Patent Application Publication No. 2005-35313, for example).

To ensure that power is transmitted from the driving apparatus installed in a longitudinal direction of the vehicle to a front wheel, a differential mechanism is often disposed to the rear of the power generation motor, as in the driving apparatus described in Japanese Unexamined Patent Application Publication No. 2005-35313. However, to secure a space for disposing the differential mechanism, the power generation motor must be designed to be thin. Hence, in a front wheel (four wheel) driving apparatus installed in a longitudinal direction of the vehicle, it is difficult to design the power generation motor such that a core diameter and a core width thereof are substantially identical in order to improve the efficiency of the power generation motor.

Further, to ensure that power is transmitted from the driving apparatus installed in a longitudinal direction of the vehicle to the front wheel, a transfer mechanism may be incorporated into the driving apparatus and a propeller shaft may be disposed so as to extend frontward from the transfer mechanism. However, when a transfer mechanism is incorporated into the driving apparatus, an output shaft of the transfer mechanism must be disposed so as to avoid the power generation motor, which is coaxial with the engine. In other words, the transfer mechanism overhangs greatly in a vehicle width direction from the driving apparatus, and as a result, it may become necessary to modify the shape of a floor tunnel in order to install the driving apparatus in a longitudinal direction of the vehicle body.

SUMMARY OF THE INVENTION

An object of the present invention is to facilitate installation of a driving apparatus into a vehicle body and improve the design freedom of a power generation motor.

In a driving apparatus for a hybrid vehicle according to the present invention, which is installed in a longitudinal direction of a vehicle body and includes an engine, a power generation motor coupled to the engine, and a travel motor coupled to a front wheel via a differential mechanism, a gear train is provided between the engine and the power generation motor, a rotary shaft of the power generation motor is disposed above a crankshaft of the engine, and a front wheel output shaft for transmitting power from the travel motor to the differential mechanism is disposed below the power generation motor.

In the driving apparatus for a hybrid vehicle according to the present invention, the rotary shaft of the power generation motor is disposed so as to deviate from the crankshaft of the engine in a vehicle width direction.

In the driving apparatus for a hybrid vehicle according to the present invention, a rotary shaft of the travel motor is disposed below the crankshaft of the engine.

In the driving apparatus for a hybrid vehicle according to the present invention, the rotary shaft of the power generation motor and the rotary shaft of the travel motor are coupled via a clutch mechanism.

In the driving apparatus for a hybrid vehicle according to the present invention, the rotary shaft of the power generation motor and the rotary shaft of the travel motor are coupled via a planetary gear train.

According to the present invention, the gear train is provided between the engine and the power generation motor, and the rotary shaft of the power generation motor is disposed above the crankshaft of the engine. Therefore, a space can be secured below the power generation motor. Hence, the front wheel output shaft can be disposed below the power generation motor, and as a result, a width dimension of the driving apparatus, including the front wheel output shaft, can be reduced. Furthermore, a space is secured below the power generation motor even when the front wheel output shaft is disposed below the power generation motor, and therefore a diameter dimension of the power generation motor can be enlarged. As a result, the power generation motor can be designed such that an improvement in efficiency is achieved.

DESCRIPTION OF THE PREFERRED EMBODIMENTS

Figure 1:
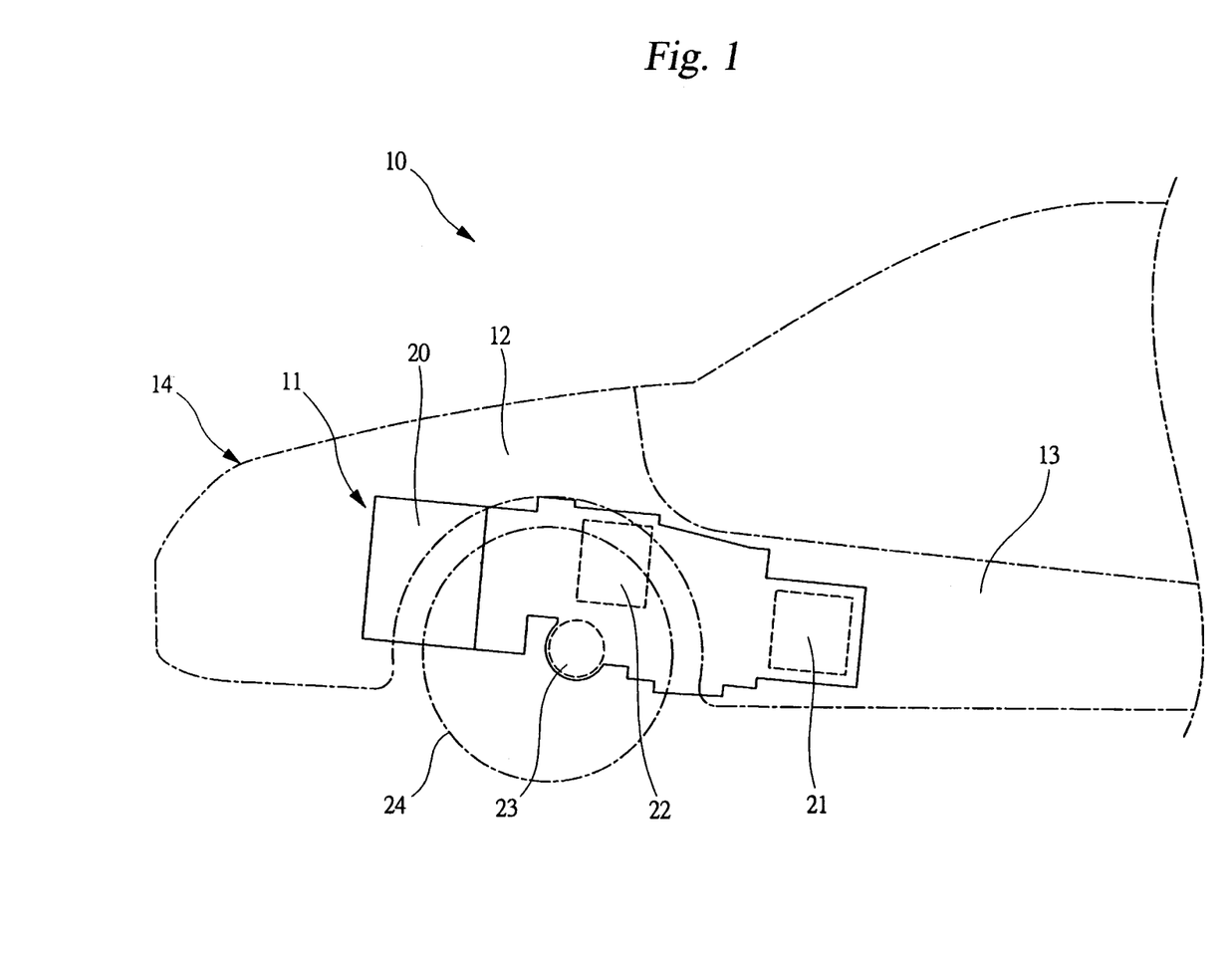
FIG. 1 is a schematic diagram showing a hybrid vehicle.
Figure 2:
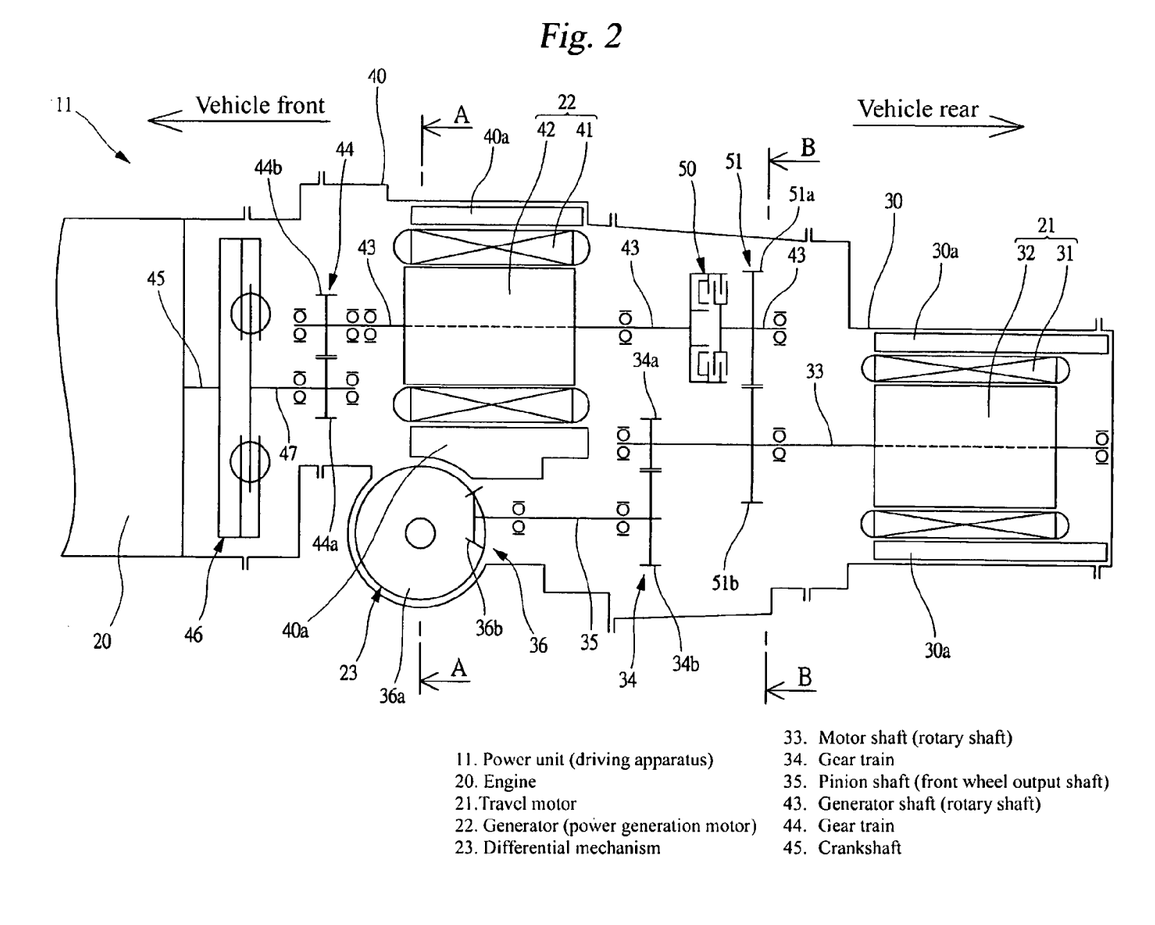
FIG. 2 is a skeleton diagram showing an internal structure of a power unit.

Embodiments of the present invention will be described in detail below on the basis of the drawings. FIG. 1 is a schematic diagram showing a hybrid vehicle 10. A power unit 11 is installed in the hybrid vehicle 10 as a driving apparatus according to an embodiment of the present invention. FIG. 2 is a skeleton diagram showing an internal structure of the power unit 11.

As shown in FIG. 1, the power unit 11 is installed in a longitudinal direction of a vehicle body 14 so as to extend from an engine room 12 toward a floor tunnel 13. An engine 20 is provided on one end portion of the power unit 11, and a travel motor 21 is provided on the other end portion of the power unit 11. Further, a generator 22 is provided between the engine 20 and the travel motor 21 as a power generation motor. Furthermore, a differential mechanism 23 is disposed below the generator 22 such that engine power and motor power are output from the differential mechanism 23 toward a front wheel 24. Note that a battery is connected to the travel motor 21 and the generator 22 via an inverter, not shown in the drawing. The power unit 11 is a so-called series parallel system power unit.

As shown in FIG. 2, the travel motor 21 is housed in a rear case 30 forming a rear end portion of the power unit 11. The travel motor 21 includes a stator 31 fixed to the rear case 30 and a rotor 32 housed inside the stator 31 so as to be free to rotate. A motor shaft (a rotary shaft) 33 is provided on the rotor 32 of the travel motor 21, and a drive gear 34a is fixed to an end portion of the motor shaft 33. Further, a driven gear 34b that meshes with the drive gear 34a of the motor shaft 33 is fixed to a pinion shaft (a front wheel output shaft) 35 provided between the motor shaft 33 and the differential mechanism 23. Furthermore, a pinion gear 36b that meshes with a ring gear 36a of the differential mechanism 23 is fixed to an end portion of the pinion shaft 35. Thus, motor power from the travel motor 21 is input into the differential mechanism 23 from the motor shaft 33 via a gear train 34 and the pinion shaft 35.

The generator 22 is housed in a main case 40 forming a central portion of the power unit 11. The generator 22 includes a stator 41 fixed to the main case 40 and a rotor 42 housed inside the stator 41 so as to be free to rotate. A generator shaft (a rotary shaft) 43 that extends in a vehicle front-rear direction is provided on the rotor 42 of the generator 22, and a driven gear 44b is fixed to a vehicle front side end portion of the generator shaft 43. An engine output shaft 47 is coupled to a crankshaft 45 of the engine 20 via a damper mechanism 46, and a drive gear 44a that meshes with the driven gear 44b is fixed to an end portion of the engine output shaft 47. Thus, engine power from the engine 20 is input into the generator 22 via the damper mechanism 46, the engine output shaft 47, a gear train 44, and the generator shaft 43. Note that an oil pump is coupled to the generator shaft 43 via a drive chain, not shown in the drawing, and lubricating oil is supplied from the oil pump as the generator shaft 43 rotates.

Water jackets 30a and 40a for guiding cooling liquid are formed respectively in the rear case 30 housing the travel motor 21 and the main case 40 housing the generator 22. Ribs or the like are formed in the water jackets 30a and 40a to increase a cooling efficiency of the travel motor 21 and the generator 22. Further, partition walls, not shown in the drawing, are formed respectively in the rear case 30 and the main case 40 to keep the travel motor 21 and the generator 22 in a dry condition, i.e. not in contact with the lubricating oil and so on.

Further, a clutch mechanism 50 and a drive gear 51a are provided on a vehicle rear side end portion of the generator shaft 43, and a driven gear 51b that meshes with the drive gear 51a is fixed to the motor shaft 33. Thus, the motor shaft 33 and the generator shaft 43 are coupled via the clutch mechanism 50 and a gear train 51. By controlling the clutch mechanism 50 of the generator shaft 43, a driving system of the power unit 11 can be switched between a parallel system and a series system. More specifically, when the clutch mechanism 50 is engaged, the engine 20 and the travel motor 21 are connected to the front wheel 24, and therefore the power unit 11 is switched to the parallel system, in which engine power and motor power are transmitted to the front wheel 24. When the clutch mechanism 50 is disengaged, on the other hand, only the travel motor 21 is connected to the front wheel 24, and therefore the power unit 11 is switched to the series system, in which only motor power is transmitted to the front wheel 24. Note that when the power unit 11 is driven using the series system, the engine 20 is driven in accordance with a state of charge of the battery and a traveling condition of the vehicle, and the generator 22 is driven to generate power by the resulting engine power.

The travel motor 21 is capable of functioning as a power generator, and the generator 22 is capable of functioning as a motor. For example, by causing the travel motor 21 to operate as a power generator in addition to the generator 22 during vehicle braking, a large amount of kinetic energy can be converted into electric energy and collected. Further, by causing the generator 22 to operate as a motor in addition to the travel motor 21 during vehicle acceleration and high-speed travel, a travel performance of the vehicle can be improved.

Since the gear train 44 is provided between the engine 20 and the generator 22, as described above, the generator shaft 43 can be disposed above the crankshaft 45. In other words, the generator 22 can be shifted upward within the power unit 11, and therefore a space can be secured below the generator 22. Hence, even when the pinion shaft 35 and the differential mechanism 23 are disposed below the generator 22, as shown in the drawing, the generator 22 and the differential mechanism 23 can be separated from each other vertically, and as a result, a diameter dimension of the generator 22 can be enlarged. Thus, a design freedom of the generator 22 can be improved, and therefore a core diameter of the generator 22 can be enlarged such that the core diameter approaches a core width of the generator 22. As a result, a highly efficient generator 22 can be installed in the power unit 11.

Further, by moving the generator 22 upward within the power unit 11 and disposing the differential mechanism 23 and the pinion shaft 35 below the generator 22, a width dimension of the power unit 11 can be reduced. As a result, the power unit 11 can be installed in the vehicle body 14 more easily. Furthermore, by separating the generator 22 and the differential mechanism 23 from each other vertically, the differential mechanism 23 can be moved in the front-rear direction, enabling a dramatic increase in the design freedom of the power unit 11.

As shown in FIG. 2, the motor shaft 33 of the travel motor 21 is disposed below the crankshaft 45 of the engine 20. Therefore, the position of the travel motor 21 within the power unit 11 can be lowered, and as a result, a diameter dimension of the power motor 21 can be increased. More specifically, by moving the motor shaft 33 below the crankshaft 45, the rear end portion of the power unit 11 can be moved below the front end portion in accordance with the shape of the floor tunnel 13. In so doing, a clearance can be secured within the floor tunnel 13 at the rear end portion of the power unit 11, enabling an increase in the diameter dimension of the travel motor 21. Hence, a core diameter of the travel motor 21 can be enlarged such that the core diameter approaches a core width of the travel motor 21, and as a result, a highly efficient travel motor 21 can be installed in the power unit 11.

Furthermore, by coupling the engine 20 and the generator 22 via the gear train 44, the engine 20 and the generator 22 can both be operated efficiently even when a rotation region in which the efficiency of the engine 20 is favorable differs from a rotation region in which the efficiency of the generator 22 is favorable. For example, in the case in which the efficiency of the engine 20 is favorable in a low rotation region whereas the efficiency of the generator 22 is favorable in a high rotation region, the engine 20 and the generator 22 can both be operated in rotation regions exhibiting favorable efficiency by designing the gear train 44 on a speed increasing side.

Further, the gear train 34 is provided between the motor shaft 33 and the pinion shaft 35, the gear train 36 is provided between the pinion shaft 35 and the differential mechanism 23, and the gear train 51 is provided between the generator shaft 43 and the motor shaft 33. By providing the gear trains 34, 36 and 51 in this manner, the travel motor 21 and the engine 20 can be operated efficiently. More specifically, by adjusting gear ratios of the gear trains 34 and 36 on the basis of traveling conditions for series travel and parallel travel, the travel motor 21 can be caused to operate in a rotation region exhibiting favorable efficiency. Similarly, by adjusting a gear ratio of the gear train 51 on the basis of the gear ratios of the gear trains 34 and 36 and the traveling condition for parallel travel, the engine 20 can be caused to operate in a rotation region exhibiting favorable efficiency.

Figure 3:
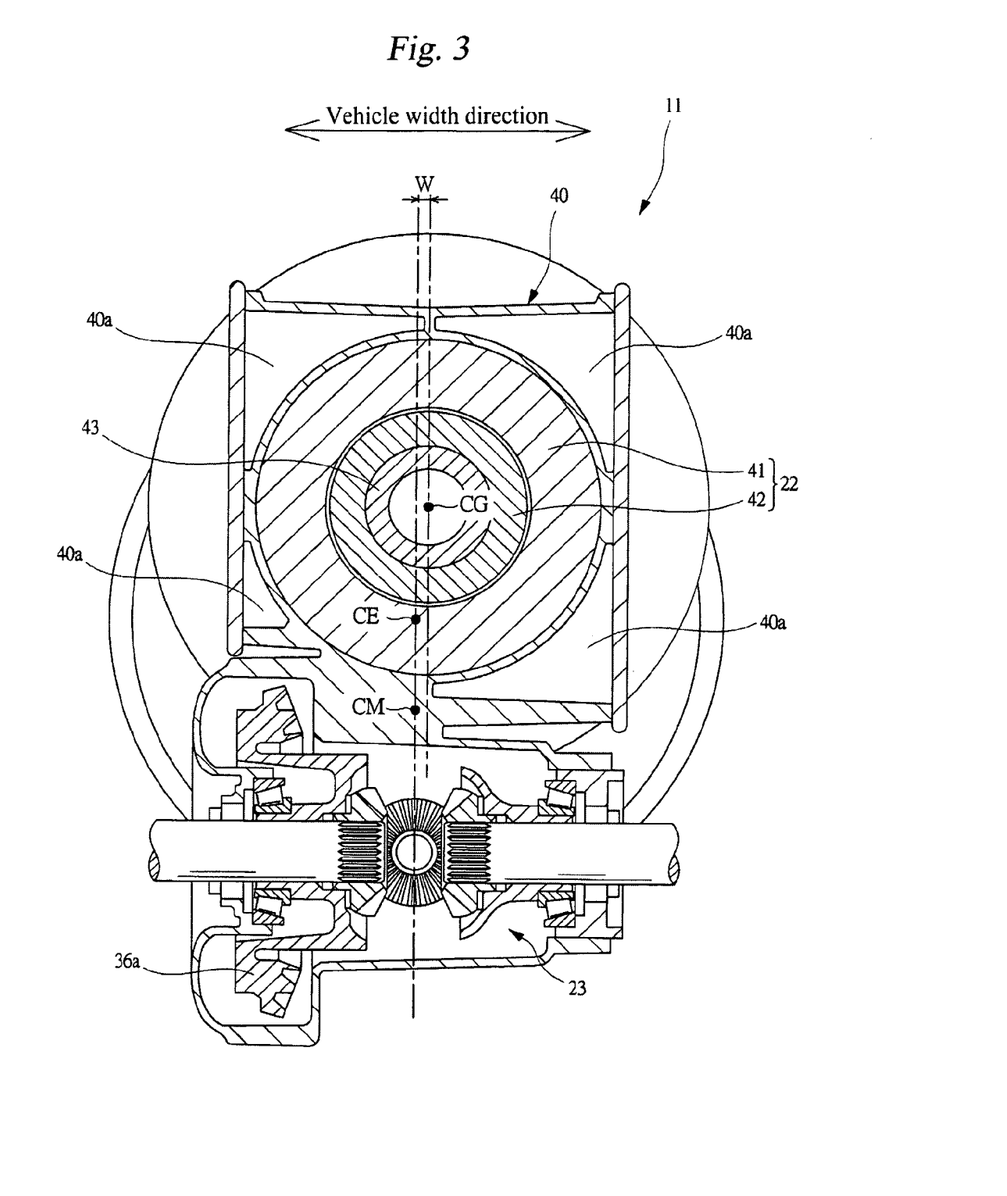
FIG. 3 is a sectional view showing the internal structure of the power unit, viewed along arrows A-A in FIG. 2.
Figure 4:
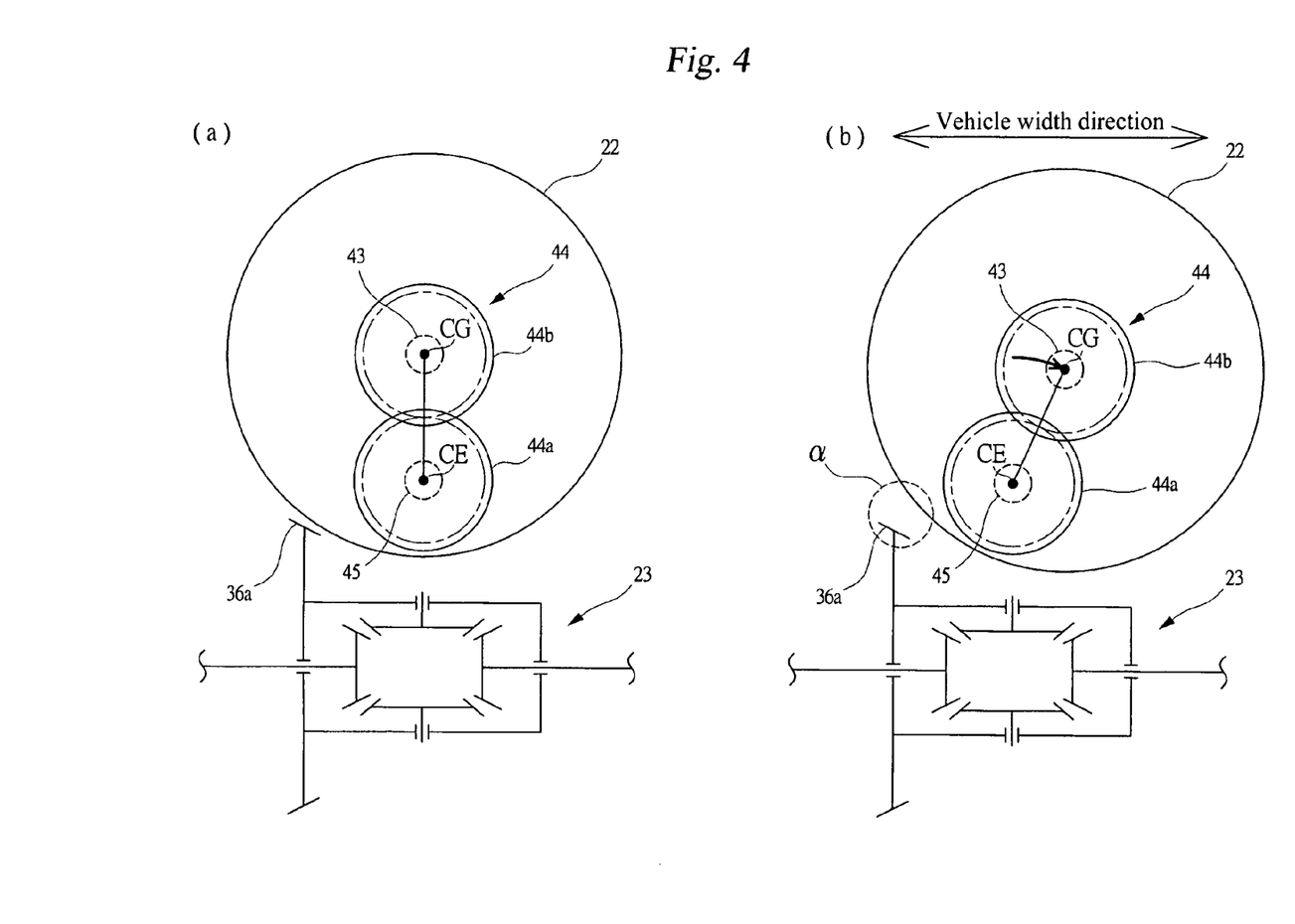
FIGS. 4A and 4B are illustrative views showing simplifications of the internal structure of the power unit shown in FIG. 3.

Next, another effect obtained by providing the gear train 44 between the engine 20 and the generator 22 will be described. Here, FIG. 3 is a sectional view showing the internal structure of the power unit 11, viewed along arrows A-A in FIG. 2. Further, FIGS. 4A and 4B are illustrative views showing a simplification of the internal structure of the power unit 11 shown in FIG. 3: FIG. 4A shows a state in which a rotary center CE of the engine 20 and a rotary center CG of the generator 22 match in a vehicle width direction; and FIG. 4B shows a state in which the rotary center CE of the engine 20 deviates from the rotary center CG of the generator 22 in the vehicle width direction. Note that the rotary center CE of the engine 20 corresponds to the center of the crankshaft 45, while the rotary center CG of the generator 22 corresponds to the center of the generator shaft 43.

As shown in FIG. 3, the rotary center CG of the generator 22 deviates from the rotary center CE of the engine 20 by a distance W in the vehicle width direction. In other words, the crankshaft 45 and the generator shaft 43 are coupled via the gear train 44, and to ensure that the generator shaft 43 can rotate about the crankshaft 45, the crankshaft 45 and the generator shaft 43 are disposed so as to deviate from each other in the vehicle width direction. Hence, the generator 22 can be shifted in the vehicle width direction so as to avoid the ring gear 36a of the differential mechanism 23. More specifically, when the crankshaft 45 and the generator shaft 43 are disposed so as to deviate from each other in the vehicle width direction, as shown in FIG. 4B, the generator 22 can be separated from the ring gear 36a, as indicated by a symbol α, in comparison with the case in which the crankshaft 45 and the generator shaft 43 do not deviate from each other in the vehicle width direction, as shown in FIG. 4A.

Hence, the generator 22 can be separated from the ring gear 36a, and therefore the diameter dimension of the generator 22 can be enlarged. Accordingly, the core diameter of the generator 22 can be enlarged such that the core diameter approaches the core width of the generator 22, and as a result, a highly efficient generator 22 can be installed in the power unit 11. Further, since a space is generated between the generator 22 and the ring gear 36a, and the water jackets 30a and 40a can be enlarged using this space. As a result, a cooling performance of the generator 22 can be improved.

Figure 5:
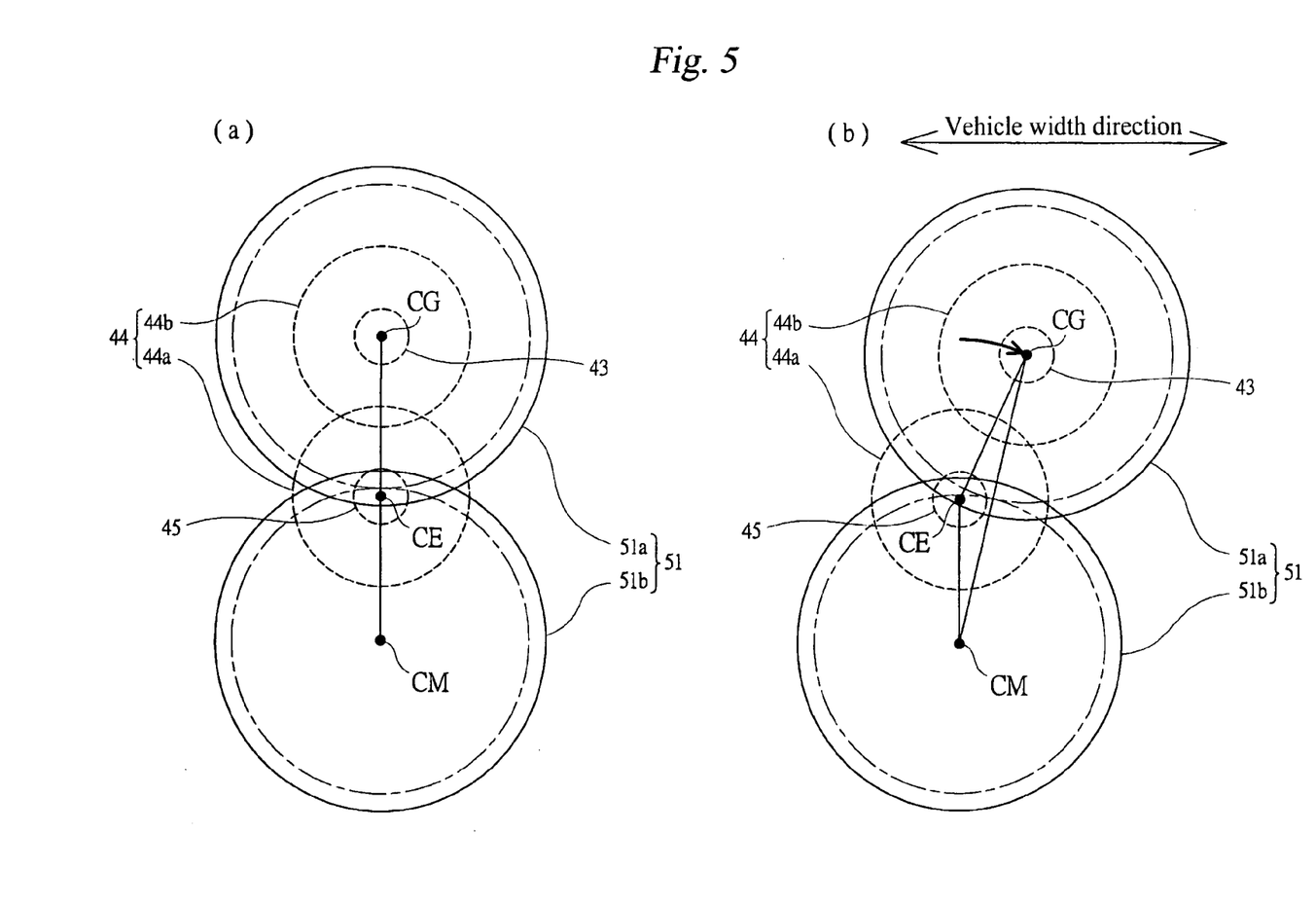
FIGS. 5A and 5B are illustrative views showing simplifications of a positional relationship between gear trains, viewed along arrows B-B in FIG. 2.
Figure 6:
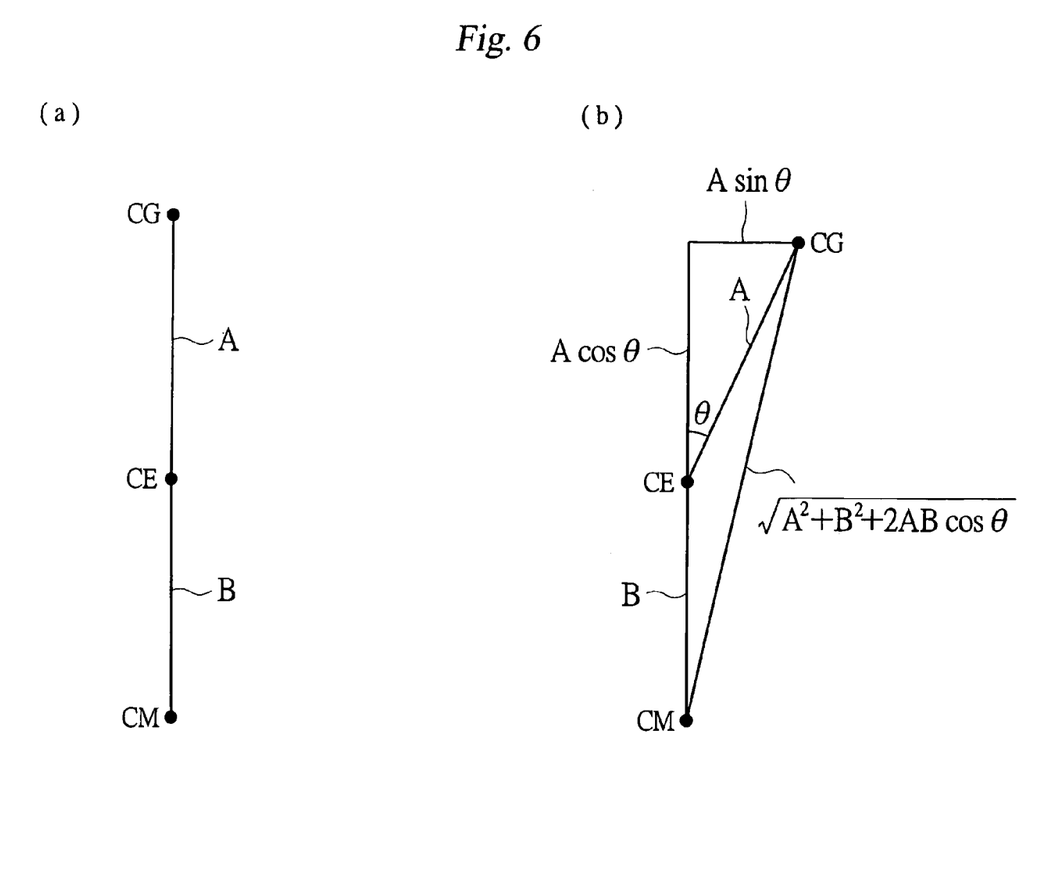
FIG. 6A is an illustrative view showing an enlargement of rotary centers CE, CG and CM shown in FIG. 5A.
FIG. 6B is an illustrative view showing an enlargement of rotary centers CE, CG and CM shown in FIG. 5B.

Next, another effect obtained by providing the gear train 44 between the engine 20 and the generator 22 will be described. Here, FIGS. 5A and 5B are illustrative views showing a simplification of a positional relationship between the gear trains 44 and 51, viewed along arrows B-B in FIG. 2: FIG. 5A shows a state in which the rotary centers CE and CG match in the vehicle width direction; and FIG. 5B shows a state in which the rotary centers CE and CG deviate from each other in the vehicle width direction. Further, FIG. 6A is an illustrative view showing an enlargement of rotary centers CE, CG and CM shown in FIG. 5A, and FIG. 6B is an illustrative view showing an enlargement of rotary centers CE, CG and CM shown in FIG. 5B. Note that the rotary center CM is a rotary center of the travel motor 21, and corresponds to the center of the motor shaft 33.

As described above, the gear train 44 is provided between the engine 20 and the generator 22, and the generator 43 is disposed so as to rotate about the crankshaft 45. By causing the generator 22 to rotate about the crankshaft 45 in this manner, an inter-shaft distance between the motor shaft 33 and the generator shaft 43 can be narrowed. More specifically, when a distance between the rotary centers CG and CE is set as "A" and a distance between the rotary centers CE and CM is set as "B" in the case in which the respective rotary centers CE, CG and CM are disposed in a vertical line, as shown in FIG. 6A, a distance between the rotary centers CG and CM is "A+B." When the rotary center CG is rotated by a predetermined angle θ about the rotary center CE, as shown in FIG. 6B, on the other hand, the distance between the rotary centers CG, and CM becomes "$\sqrt{(A^2+B^2+2AB\cos\theta)}$". By rotating the generator shaft 43 about the crankshaft 45 in this manner, the distance between the rotary center CG and the rotary center CM, or in other words the inter-shaft distance between the motor shaft 33 and the generator shaft 43, can be narrowed, enabling a reduction in the size of the drive gear 51a and the driven gear 51b constituting the gear train 51. As a result, the gear train 51 can be reduced in weight and cost, and due to the reduction in size, a rotation resistance of the gear train 51 can also be reduced.

The power unit 11 described above is a series parallel system power unit, but the present invention is not limited thereto and may be applied to a series system power unit or a parallel system power unit. To construct a series system power unit on the basis of the power unit 11 described above, the clutch mechanism 50 and the gear train 51 coupling the generator shaft 43 to the motor shaft 33 are removed. Even in a series system power unit constructed in this manner, similar effects to those of the power unit 11 described above can be obtained by providing the gear train 44 between the engine 20 and the generator 22.

Figure 7:
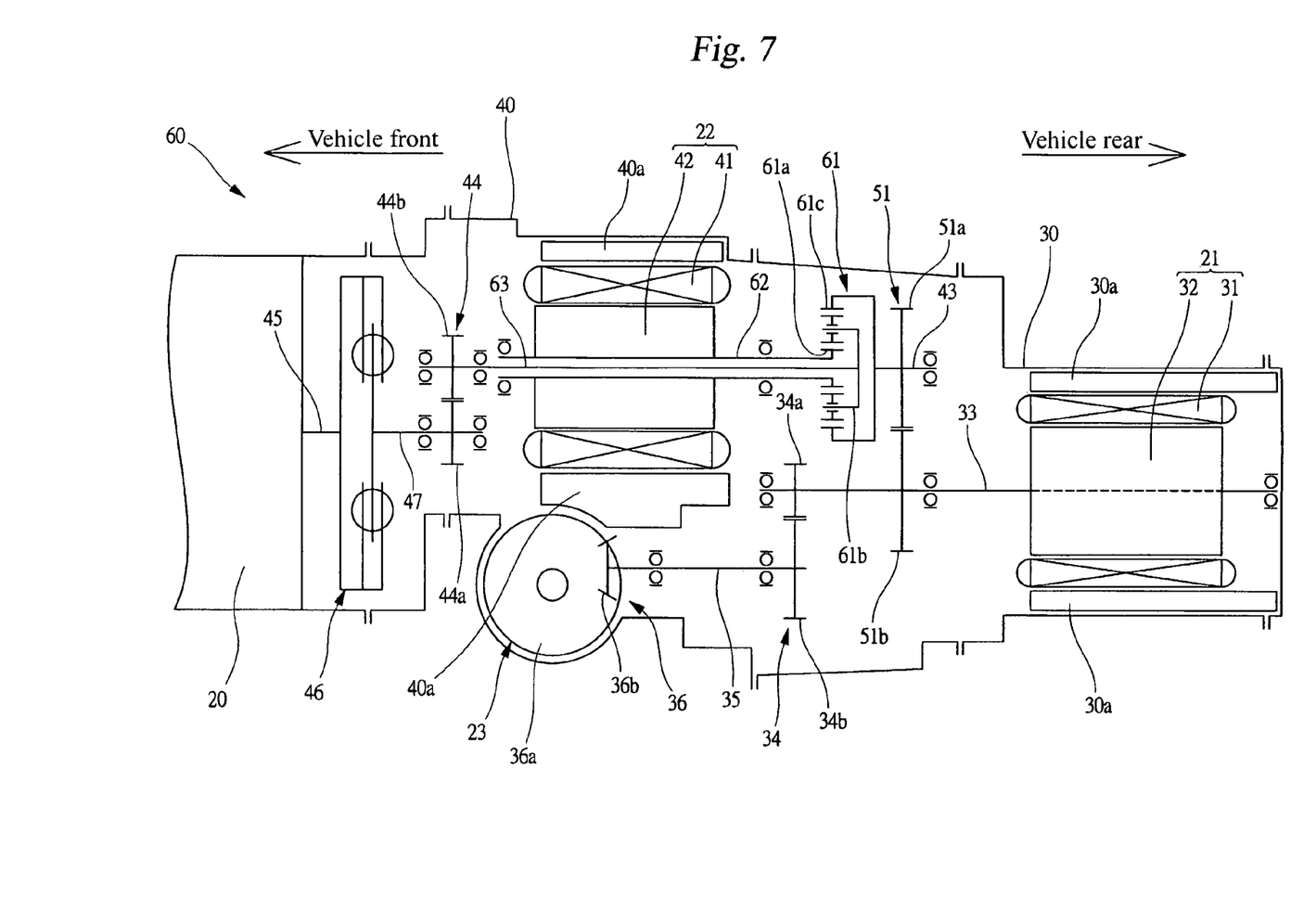
FIG. 7 is a skeleton diagram showing a parallel system power unit serving as a driving apparatus according to another embodiment of the present invention.

FIG. 7 is a skeleton diagram showing a parallel system power unit 60 serving as a driving apparatus according to another embodiment of the present invention. In FIG. 7, identical members to the members shown in FIG. 2 have been allocated identical reference symbols, and description thereof has been omitted. As shown in FIG. 7, a planetary gear train 61 that distributes engine power between the generator 22 and the differential mechanism 23 is disposed on a vehicle rear side of the generator 22. A generator shaft (a rotary shaft) 62 having a hollow structure is provided on the rotor 42 of the generator 22, and the generator shaft 62 is coupled to a sun gear 61a of the planetary gear train 61. Further, a transmission shaft 63 that extends from the driven gear 44b of the gear train 44 is housed in a hollow portion of the generator shaft 62, and an end portion of the transmission shaft 63 is coupled to a carrier 61*b* of the planetary gear train 61. Furthermore, a ring gear 61*c* of the planetary gear train 61 is coupled to the drive gear 51*a* of the gear train 51. Even in the parallel system power unit 60 constituted in this manner, similar effects to those of the power unit 11 described above can be obtained by providing the gear train 44 between the engine 20 and the generator 22.

The present invention is not limited to the embodiments described above, and may be subjected to various modifications within a scope that does not depart from the spirit thereof. For example, the power unit 11 and 60 shown in the drawings is a front wheel drive power unit for transmitting power to the front wheel 24 serving as a drive wheel, but the present invention is not limited thereto and may be applied effectively to a four wheel drive power unit for transmitting power to a rear wheel in addition to the front wheel 24. Further, the differential mechanism 23 is incorporated into the power unit 11 and 60 shown in the drawings, but the present invention is not limited thereto, and the differential mechanism 23 may be disposed on the exterior of the power unit 11 and 60. In this case, a propeller shaft driven by a front wheel output shaft is disposed to extend toward the front of the vehicle, and the external differential mechanism is driven by this propeller shaft. The front wheel output shaft is disposed below the generator 22, similarly to the pinion shaft 35 of the power unit 11 described above, and therefore the width dimension of the power unit can be reduced, enabling easier installation in the vehicle body 14. Furthermore, the propeller shaft extends frontward from the front wheel output shaft and can therefore be disposed without affecting the shape of the floor tunnel 13.

What is claimed is:

1. A driving apparatus for a hybrid vehicle, which is installed in a longitudinal direction of a vehicle main body of the hybrid vehicle, the driving apparatus comprising:
    an engine;
    a first motor for generating power coupled to the engine; and
    a second motor for driving a front wheel and being coupled to the front wheel via a differential mechanism,
    wherein a gear train is provided between the engine and the first motor,
    wherein a rotary shaft of the first motor is disposed above a crankshaft of the engine,
    wherein a front wheel output shaft for transmitting power from the second motor to the differential mechanism, the front wheel output shaft and the differential mechanism are disposed below the first motor,
    wherein the rotary shaft of the first motor is not parallel to the crankshaft of the engine and is disposed to avoid a ring gear of the differential mechanism, and
    wherein the rotary shaft of the first motor is separated in a vertical direction from the ring gear of the differential mechanism.

2. The driving apparatus for a hybrid vehicle according to claim 1, wherein a rotary shaft of the second motor is disposed below the crankshaft of the engine.

3. The driving apparatus for a hybrid vehicle according to claim 1, wherein the rotary shaft of the first motor and a rotary shaft of the second motor are coupled via a clutch mechanism.

4. The driving apparatus for a hybrid vehicle according to claim 1, wherein the rotary shaft of the first motor and a rotary shaft of the second motor are coupled via a planetary gear train.

5. The driving apparatus for a hybrid vehicle according to claim 1, further comprising:
    a rear case for housing the second motor;
    a main case for housing the first motor; and
    water jackets for cooling being formed in the rear case and the main case, respectively.

6. The driving apparatus for a hybrid vehicle according to claim 1, wherein a core diameter of the first motor is substantially equal to a core width of the first motor.

7. A driving apparatus for a hybrid vehicle, comprising:
    an engine;
    a first motor for generating power coupled to the engine; and
    a second motor for driving a front wheel and being coupled to the front wheel via a differential mechanism,
    wherein a gear train is provided between the engine and the first motor,
    wherein a rotary shaft of the first motor is disposed above a crankshaft of the engine,
    wherein a front wheel output shaft for transmitting power from the second motor to the differential mechanism is disposed below the first motor,
    wherein the differential mechanism is disposed below the first motor, and
    wherein the rotary shaft of the first motor is not parallel to the crankshaft of the engine and is disposed to avoid a ring gear of the differential mechanism, and
    wherein the rotary shaft of the first motor is separated in a vertical direction from the ring gear of the differential mechanism.

8. The driving apparatus according to claim 7 configured for assembly in a longitudinal direction of a vehicle main body of the hybrid vehicle.

* * * * *